United States Patent
Parthasarathy et al.

(10) Patent No.: US 11,526,347 B2
(45) Date of Patent: Dec. 13, 2022

(54) INTELLIGENT SOFTWARE PATCH MANAGEMENT

(71) Applicant: VMware, Inc., Palo Alto, CA (US)

(72) Inventors: Kannan Parthasarathy, Palo Alto, CA (US); Srinivas Rao Doddi, Palo Alto, CA (US); Hayden Davis, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/231,516

(22) Filed: Apr. 15, 2021

(65) Prior Publication Data
US 2022/0342659 A1    Oct. 27, 2022

(51) Int. Cl.
*G06F 8/658*    (2018.01)
*G06F 11/30*    (2006.01)
*G06F 11/34*    (2006.01)

(52) U.S. Cl.
CPC .......... *G06F 8/658* (2018.02); *G06F 11/3051* (2013.01); *G06F 11/3409* (2013.01)

(58) Field of Classification Search
None
See application file for complete search history.

(56) References Cited

U.S. PATENT DOCUMENTS

| | | | |
|---|---|---|---|
| 2015/0089488 A1* | 3/2015 | Anderson | G06F 8/65 717/172 |
| 2015/0100956 A1* | 4/2015 | Uthe | G06F 8/65 717/172 |
| 2015/0178063 A1* | 6/2015 | Narkinsky | G06F 8/65 717/168 |
| 2016/0103671 A1* | 4/2016 | Curran | G06F 8/658 717/169 |
| 2016/0283219 A1* | 9/2016 | Banford | G06F 8/658 |
| 2018/0285086 A1* | 10/2018 | O'Malley | H04L 67/303 |
| 2021/0286638 A1* | 9/2021 | Fan | H04L 41/5051 |

* cited by examiner

*Primary Examiner* — Qing Chen
(74) *Attorney, Agent, or Firm* — Clayton, McKay & Bailey, PC

(57) ABSTRACT

Systems and methods are described for intelligent software patch management. In an example, a system can receive a selection of device attributes. The system can associate a group of computing devices with attribute values that correspond to each device. The system can also create value pairs of unique pairs of values for each computing device. The system can select a set of computing devices for a deployment ring that maximizes diversity of the values or value pairs. The system can deploy the software patch to the selected devices and monitor device performance for a predetermined period of time before continuing to the next deployment ring or rolling back the update.

20 Claims, 7 Drawing Sheets

INTELLIGENT SOFTWARE PATCH MANAGEMENT

BACKGROUND

IT administrators in enterprises face enormous challenges today managing end-user devices and servers that run critical applications. More specifically, IT administrators struggle with software management in an era when patches to operating systems and applications are released at a high frequency. The heterogeneity of devices is a key reason for many of these challenges. Each device has an associated context that is defined by attributes such as the device model, operating system version, firmware/bios version, memory and disk size, the set of applications installed on the device, and many more. A new software patch might be fine for one device context, but not another. It is difficult to know ahead of time if a software patch will result in issues for any given context. The only way to find out is to actually deploy the patch and monitor the device for a period of time.

In an attempt to alleviate this problem, IT administrators use so-called deployment rings, which is like a "testing the waters" approach. When a new software patch needs to be deployed to devices, a small set of devices is selected first, and the patch is deployed to and tested on those devices. If no undesirable side-effects are discovered during a pre-defined test period, the patch is deployed to a larger set, the next "ring," of devices and they are monitored over a period of time. The process of monitoring newly patched devices over a pre-defined period of time and expanding the ring of devices is repeated until all applicable devices have been patched. If undesirable side-effects are discovered at any time, manual intervention is typically needed to find specific incompatibilities and come up with solutions or workarounds before the deployment process can continue.

The cycle time to deploy a new patch is usually about 4 weeks. The number of rings, composition and size of each ring, and the cycle time for completing a software deployment—all these can vary across enterprises and even within enterprises. Deployment rings allow for early detection of problems before they become more widespread. However, their efficacy depends on how the devices in each ring are chosen. Devices in each ring are typically chosen based on factors such as the department, group, or geographic location of the user. For example, the first pilot ring is usually a set of "test" users in the IT department. The second ring has the early adopters or otherwise tech-savvy users. It is easy to see why such an approach does not necessarily detect problems early—it simply ignores the diversity of contexts that occur in the entire population of the devices. In fact, this strategy has a bias for selecting a more homogenous set of devices (e.g., same department, location). As a result, deployments of software patches are frequently interrupted in late stages as new issues are uncovered when new contexts are introduced. The frequent interruptions require manual efforts to debug and find solutions or workarounds and make it extremely hard to automate the deployment process.

As a result, a need exists for intelligently deploying software patches in a way that that maximizes device contexts.

SUMMARY

Examples described herein include systems and methods for intelligent software patch management. In an example, an intelligent software deployment system ("ISDS") can receive selection of one or more device attributes, such as a device model, a device manufacturer, an OS type, an OS version, a firmware version, a memory size, a storage disk size, OS settings, application settings, a set of applications installed on the device, a primary geographic location of the device, and a user group associated with the device. In one example, the selection of device attributes can be received as part of a software deployment plan.

The ISDS can assign values of the attributes to each computing device that should receive the software patch. The assigned values can correspond to attributes of the device. In one example, the ISDS can also assign weights to certain attributes based on input received from a user. In another example, the ISDS can assign costs to certain devices based on input received from a user. In still another example, weights and costs can be assigned automatically based on previous input.

In one example, the ISDS can construct contextual elements for each computing device. Contextual elements can include pairs of attribute values corresponding to the computing device. For example, a contextual element can include the OS version and model of a computing device, or a firmware version and a certain application. In one example, the ISDS can create a contextual element for each unique value pairing for each computing device.

In an example, the ISDS can select computing devices for a deployment ring of the software update. The number of devices selected can be based on a deployment budget. In one example, the deployment budget can be a number of computing devices. In another example, the deployment budget can be a total device cost amount, and the number of devices included can depend on the costs of the devices selected.

In an example, selecting computing devices can include maximizing the diversity of the computing devices. Maximizing diversity can include selecting a set of computing devices that represents the greatest variety of values from the selected device attributes. In one example, the ISDS can maximize the diversity of contextual elements. This can vary the combinations of attribute values being tested and monitored during deployment rings, and can thus help identify potential issues in the software patch caused by unique combinations earlier in the deployment process. In one example, the ISDS can maximize diversity by applying a maximum coverage algorithm. To save on computing resources and time, the ISDS can be configured to apply a greedy algorithm that more speedily develops an approximation based on performance bounds.

After the devices have been selected, the ISDS can deploy the software patch to the selected devices. The ISDS can then monitor performance metrics from the computing devices to determine how the software patch is performing. The ISDS can compare performance data from the computing devices to baseline measurements. Where the device performance varies from a baseline by an amount greater than a predetermined threshold, the ISDS can take a predetermined action, such as stopping the deployment or rolling back the software patch. Where the device performance remains within the threshold limits, the ISDS can continue deploying the software patch.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for intelligent software patch management. In an example, a system can receive a selection of device attributes. The system can associate a group of computing devices with attribute values that correspond to each device. The system can also create value pairs of unique pairs of values for each computing device. The system can select a set of computing devices for a deployment ring that maximizes diversity of the values or value pairs. The system can deploy the software patch to the selected devices and monitor device performance for a predetermined period of time.

Figure 1:
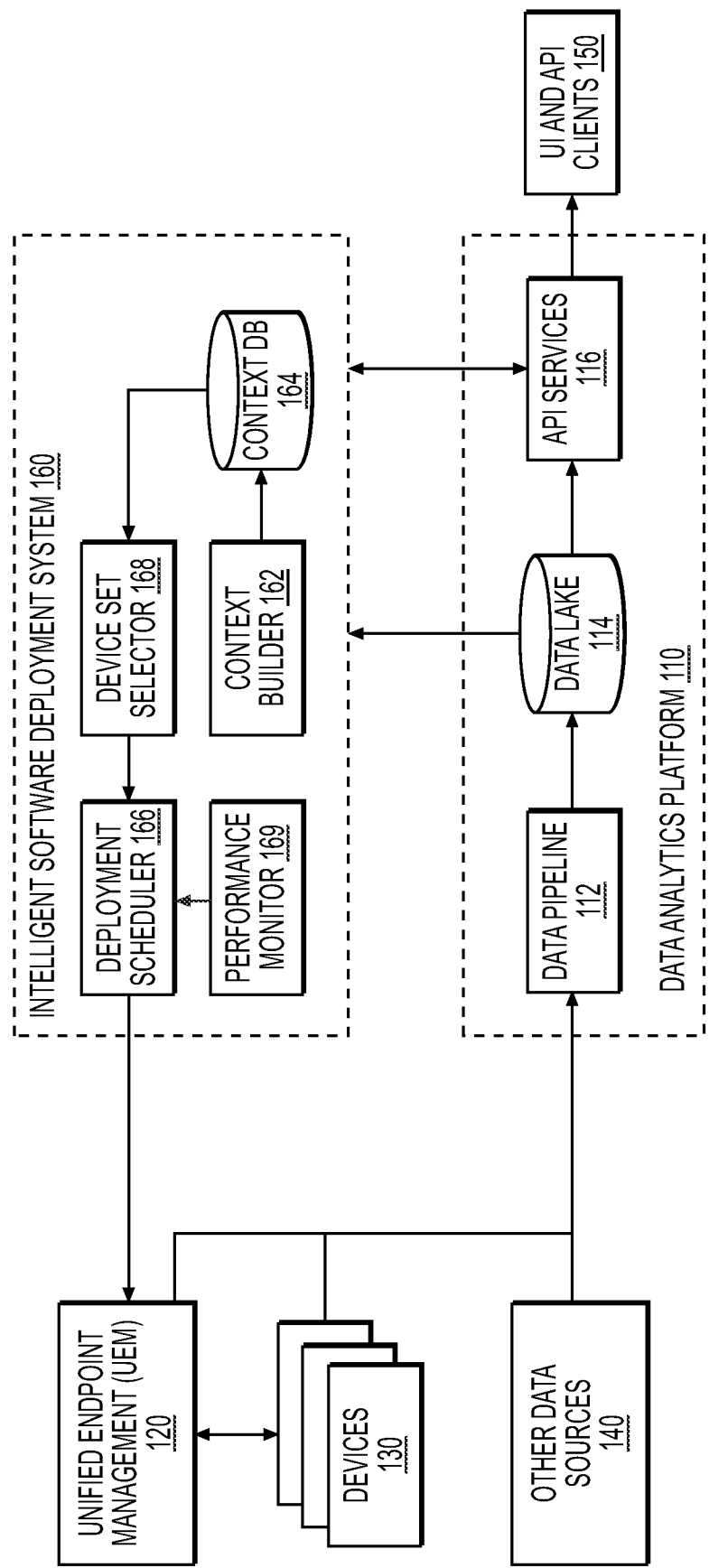
FIG. 1 is an illustration of a system for performing intelligent software patch management.

FIG. 1 is an illustration of a system for performing intelligent software patch management. The system can include a data analytics platform ("DAP") 110 that receives data from a variety of data sources, such as a Unified Endpoint Management ("UEM") system 120, computing devices 130 (frequently referred to herein as "device 130" or "devices 130"), and other data sources 140 such as endpoint security systems, security information and event management systems ("SIEM"), and Identity and Access management systems. The DAP 110 can be a single server or a group of servers, including multiple servers implemented virtually across multiple computing platforms.

The DAP 110 can include a data pipeline 112 that can be responsible for processing events received at the DAP 110. Examples of events can include enrollment of new computing devices 130 at the UEM system 120, installation of new applications on a device 130, changes in the settings of a device 130, and software updates to the OS and applications on a device 130. Processing events can include formatting received data in a way that is readable by Application Programming Interface ("API") services 116 on the DAP 110. For example, the data pipeline 112 can receive data pertaining to an event, process the data, and store the processed data in a data lake 114. In some examples, the data pipeline 112 aggregates historical data and stores the results in the data lake 114. The data in the data lake 114 can be accessed by the API services 116. The API services 116 can make data in the data lake 114 accessible to UI and API clients 150, such as user interfaces, business intelligence systems, and automation platforms.

The UEM system 120 can allow enterprises to manage work-related applications and data on enrolled computing devices 130. Users can enroll their own devices, such as cell phones, tablets, or laptops. Enrollment can include installing managed applications and other resources on the user device 130. The UEM system 120 can be a single server or a group of servers, including multiple servers implemented virtually across multiple computing platforms. Computing devices 130 can be one or more processor-based devices, such as a personal computer, tablet, cell phone, or server. When a new computing device 130 enrolls with the UEM system 120, the UEM system 120 can capture attributes of the computing device 130 and send them to the DAP 110. Some examples of such attributes can include the device model, manufacturer, hardware properties, such as memory and disk sizes, and various settings on the device. Device attributes can also be referred to as "features," and the two terms are used interchangeably throughout this application. The UEM system 120 can also install software on the computing devices 130 that collect information about the devices 130 and send the information back to the UEM system 120.

The system can include an ISDS 160 that is responsible for creating intelligent software deployment rings. In an example, the ISDS 160 can provide a graphical user interface ("GUI") that enables an administrator ("admin") user to choose attributes of devices that can be used to define a device context. In one example, a context can be a concatenation of variables, such as a device model, firmware/bios version, and a set of applications running on the device. The attributes available to an admin for selection can be obtained from the data lake 114. In one example, the admin user can also use the GUI to assign weights to different device attributes. Similarly, admin users can assign costs to devices in order to differentiate between less-critical and more-critical devices.

The ISDS 160 can include a context builder 162 that can construct a context associated with a user device 130. In an example, this can include retrieving data relevant to the selected attributes from the data lake 114 and building a table that associates each user device 130 with its applicable attributes. For example, the context builder 162 can build a table that has one row for each device 130, and one or more columns corresponding to the selected attributes, weights, and costs associated with each device 130. The context builder 162 can save the table in the context database ("DB") 164.

The GUI can include a deployment plan builder that allows an admin user to build a deployment plan for a software patch that specifies the number of deployment rings, percentage of devices in each ring, and so on. A software patch can generally mean any kind of software update. As some examples, a software patch can be for low-level firmware, an operating system, or a specific application on a device. The percentage or number of devices included in a deployment ring can be the deployment cost of that ring. Each deployment ring can include a deployment budget that is not to be exceeded by the aggregate deployment cost of devices 130 in that ring.

The ISDS 160 can include a deployment scheduler 166 that is responsible for planning and executing a software patch deployment. Once a plan is built by an admin user and saved, the deployment scheduler 166 can begin coordinating the deployment process. For example, the deployment scheduler 166 can query a device set selector module 168 to retrieve a set of devices that the software patch should be pushed to. The device set selector module 168 can have the logic to select computing devices 130 that maximize the diversity of contexts for a given deployment budget.

After the device set selector module 168 selects the devices 130 for a deployment ring, the deployment scheduler 166 can retrieve a list of the devices and send it, along with along with any other meta-data such as an identifier ("ID") for the software patch, to the UEM system 120. The UEM system 120 can be responsible for deploying the software patch to the selected user devices 130 of the deployment ring.

Once the software patch is deployed, a performance monitor 169 in the ISDS 160 can begin monitoring various performance metrics for the computing devices 130 that received the patch. For example, the performance monitor 169 can receive performance metrics collected by the DAP 110. The performance metrics can include, but are not limited to, application and OS crash rates, network latencies, CPU utilization, battery drain rates for mobile devices, security/malware incident rates, help-desk ticket rates, and any other aggregate user experience metrics. The performance monitor 169 can measure the performance metrics and compare them to a baseline. If the performance metrics fall within allowable limits of the baseline, the deployment can proceed to the next ring. If not, the deployment can be halted, and, if necessary, the software patch can be rolled back from the computing devices 130 that received it.

Figure 2:
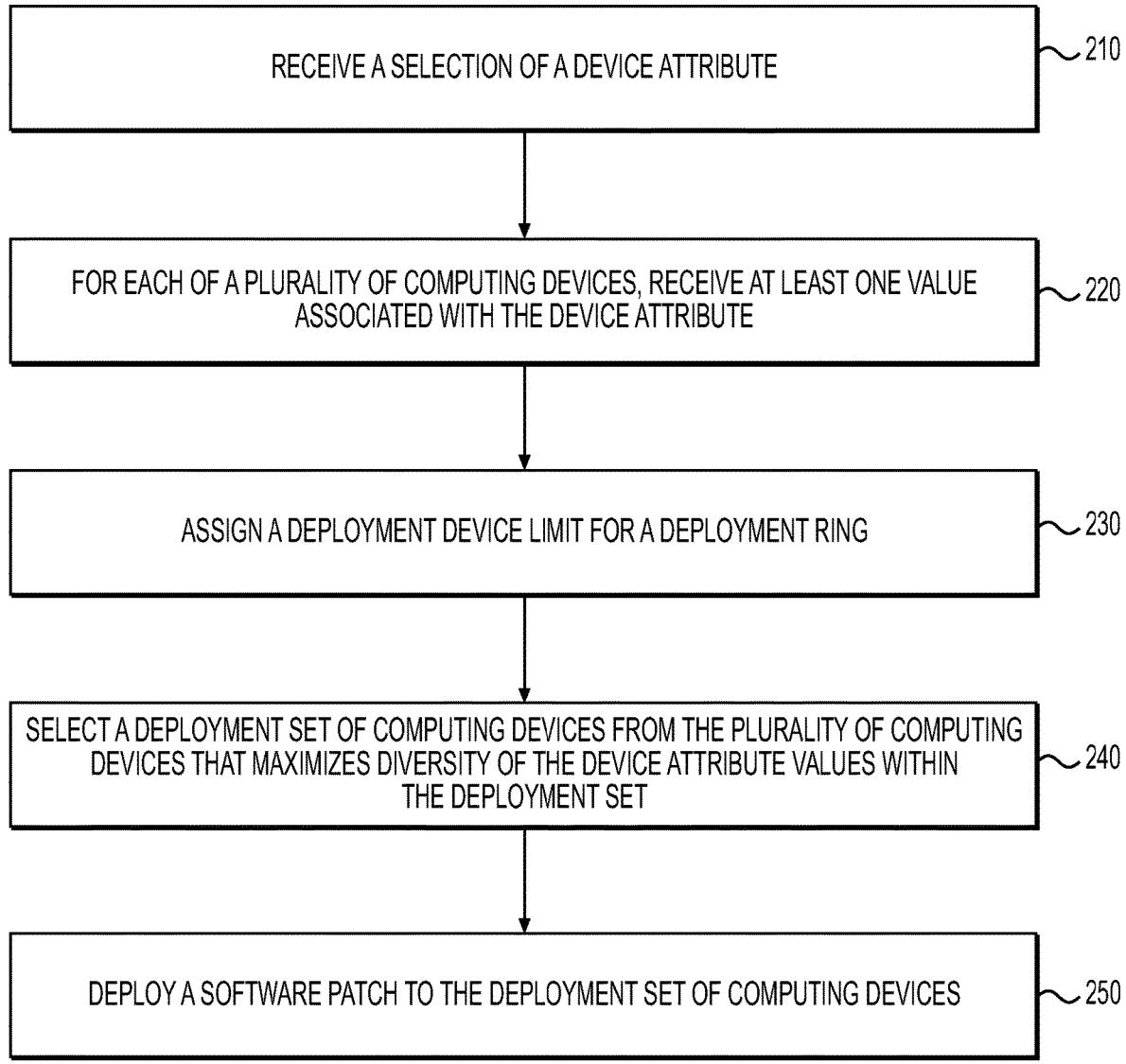
FIG. 2 is a flowchart of an example method for intelligent software patch management.

FIG. 2 is a flowchart of an example method for intelligent software patch management. At stage 210, the ISDS 160 can receive a selection of a device attribute. The selection can be of one or multiple device attributes. In an example, the ISDS 160 can provide a GUI that enables an admin user to choose attributes of devices 130 to be used in creating deployment rings for a software patch update. In an example, the device attributes can define a device context, which can be a concatenation of variables associated with a device 130. Some examples of device attributes can include a device model, a device manufacturer, an OS type, an OS version, a firmware version, a memory size, a storage disk size, OS settings, application settings, a set of applications installed on the device, a primary geographic location of the device, and a user group associated with the device or the user.

At stage 220, for each of a plurality of computing devices, the ISDS 160 can receive or assign at least one value associated with the device attribute for the computing devices 130. In an example, the DAP 110 can store information about the features of each computing device 130 in the data lake 116. Once the ISDS 160 receives the attribute selected by the admin user, the ISDS 160 can retrieve the device information and assign corresponding values of the feature to each computing device 130.

In an example, features can take on one or more values in a discrete set. For example, if the feature is the model name of the device 130, the possible values can be the set of all device models in an enterprise. The applicable value or values for each feature can be assigned to each computing device 130. As an example, let the set {"INSPIRON 7386", "ASPIRE_TC603", "LATITUDE 738"} represent a set of all device models in the enterprise, and a specific device has a feature value {"LATITUDE_7380"}. In this case, the cardinality of the feature set (i.e., the number of different device models in the organization) is three, which can be referred to as the org-level cardinality. Since a device can only be of one model type, the cardinality of the feature at the device level is one, which can be referred to as the device-level cardinality. Another example can be set of applications installed on a device 130. Let {"OUTLOOK", "WORD", "EXCEL", "ONEDRIVE"} be the set of available applications in the organization, and the set {"OUTLOOK", "WORD"} be the set of applications installed on a specific device 130. The set of applications installed on the computing device 130 represents the feature value of that device. For this application feature, the org-level cardinality is four and the device-level cardinality is two. Some features, for example the physical memory size on a device, can be quantized into bins in order to make them categorical (e.g., high, medium, low). Thus, for a specific device, the values for any feature can be picked from a discrete set. Some features can take on single values, while others can take on multiple values.

In an example, assigning values can include creating contextual elements for each available computing device 130. A contextual element can be a pair of feature values of a computing device 130. Contextual elements are discussed through this application as value pairs, but a contextual element need not be limited to just two values. In an example, a contextual element can include up to as many values as deemed necessary by an admin. The ISDS 160 can create contextual elements for each pair of feature values of the devices 130. This can allow the ISDS 160 to select devices 130 that represent a greater representation of feature value combinations. This can help identify bugs in the software patch caused by certain combinations earlier in the deployment process. For example, two computing devices 130 of the same model can be running different OS versions, and the combination of the device model with one of the OS versions can cause an issue with the software patch. By selecting and tracking devices using contextual elements, the bug can be identified more quickly.

The following example, continued from the example above, illustrates how a contextual element can be constructed. For a LATITUDE_7380 computing device 130 that has OUTLOOK and WORD installed on it, the computing device 130 can have a feature value of {LATITUDE_7380} for a computer model feature and a feature value of {"OUTLOOK", "WORD"} for an application feature. To create contextual elements for the computer device 130, the ISDS 160 can create a set of unique pairs that combine the two value sets. As an example, the computer model value set can be represented by $f_1=${"Latitude_7380"} and the application value set by $f_2=${"Outlook", "Word"}. The ISDS 160 can create contextual elements by taking the Cartesian product of the two value sets. For example, the Cartesian product of the computing features described above would be $f_1 \times f_2=$much {("Latitude_7380", "Outlook"}, ("Latitude_7380", "Word)} with each of the two pairs representing a unique contextual element for the computing device 130. In one example, the ISDS 160 can create a contextual element for each unique value pairing of a computing device 130.

In an example, the ISDS 160 can build a table that includes each computing device 130 that will receive the software patch and contextual information about each device 130. For example, the table can include one row for each device 130, and one or more columns corresponding to the selected attributes. In an example, the columns corresponding to the selected attributes can include contextual elements for the computing device 130.

At stage 230, the ISDS 160 can determine a deployment budget for a deployment ring. In an example, parameters for the deployment budget can be provided by an admin user. For example, an admin user can use a GUI to input a deployment plan, including the number of deployment rings and the number of computing device 130 that should be including in each ring. In another example, the deployment budget can be set automatically based on budgets from previous software patch deployments.

At stage 240, the ISDS 160 can select a deployment set of computing devices that maximizes diversity of the device attribute values within the deployment set. The ISDS 160 can use a maximum coverage algorithm, in an example. The goal of a maximum coverage algorithm is to find a collection of subsets (e.g., computing devices 130) such that the union of the subsets contains the largest possible number of elements (e.g., feature values). Although maximum coverage algorithms are discussed throughout, maximum coverage algorithms that find the optimal coverage sometimes can be computationally expensive and take an extensive time to run.

Alternatively, the ISDS 160 can execute a greedy algorithm that speedily develops an approximation based on performance bounds. An example greedy algorithm that finds an approximate solution to the maximum coverage problem is outlined below:

Given:
  A universal set E containing n elements $\{e_1, e_2, \ldots, e_n\}$
  A collection of m subsets $S=\{S_1, S_2, \ldots, S_m\}$; $\cup_i S_i = E$
  A number $k \leq m$
  $G \rightarrow \emptyset$; $C \rightarrow \emptyset$; $U \rightarrow S$
  while $|G| < k$ and $|C| < n$ do
    select $S_i \in U$ that maximizes $|S_i - C|$
    $G \rightarrow G \cup \{S_i\}$
    $C \rightarrow \cup S_i$
    $U \rightarrow U - \{S_i\}$
  end while
  output g In the example above, the subsets S represent the possible combinations of computing devices 130 for a deployment ring, E represents all the values of the selected features, G represents the collection of selected sets, and C represents the set of feature values that are already covered at the beginning of an iteration. The greedy algorithm shown above has an approximation ratio of $1-1/e \approx 0.63$. This means that the coverage of any solution produced by the greedy algorithm is guaranteed to be at least $(1-1/e)*OPT$, where OPT is the coverage obtained by using the optimal algorithm.

In one example, ISDS 160 can select devices 130 that represent the greatest variety of feature value pairs (i.e., contextual elements). Maximizing diversity of contextual elements can be advantageous because it can identify issues more quickly than maximizing coverage of individual feature values. For example, a LATITUDE_7380 device running a certain version of WINDOWS OS may not have any problems with a software patch, but an ASPIRE_TC603 device running the same version of WINDOWS OS may have problems with a software patch because of differences in their firmware. By only maximizing coverage of single feature values, the LATITUDE_7380 device can be selected for an update in an earlier deployment ring than the ASPIRE_TC603 device because another ASPIRE_TC603 may be selected running a different version of WINDOWS OS. This can delay detection of the bug until much later in the deployment process, thereby delaying the full rollout of the software patch. However, by maximizing value pairs, a contextual element that includes the ASPIRE_TC603 and the WINDOWS OS version will be treated as a unique value set that may be included in an earlier deployment ring.

At stage 250, the ISDS 160 can deploy a software patch to the deployment set of computing devices. In an example, deployment can be executed by the UEM system 120. For example, the ISDS 160 can send a list of devices 130 and any associated meta-data, such as a software patch ID, to the UEM system 120. The UEM system 120 can then deploy the software patch to the devices 130 in the list. For example, the UEM system 120 can store the patch in a server queue and instruct the relevant devices 130 to query the server to retrieve the patch.

Figure 3:
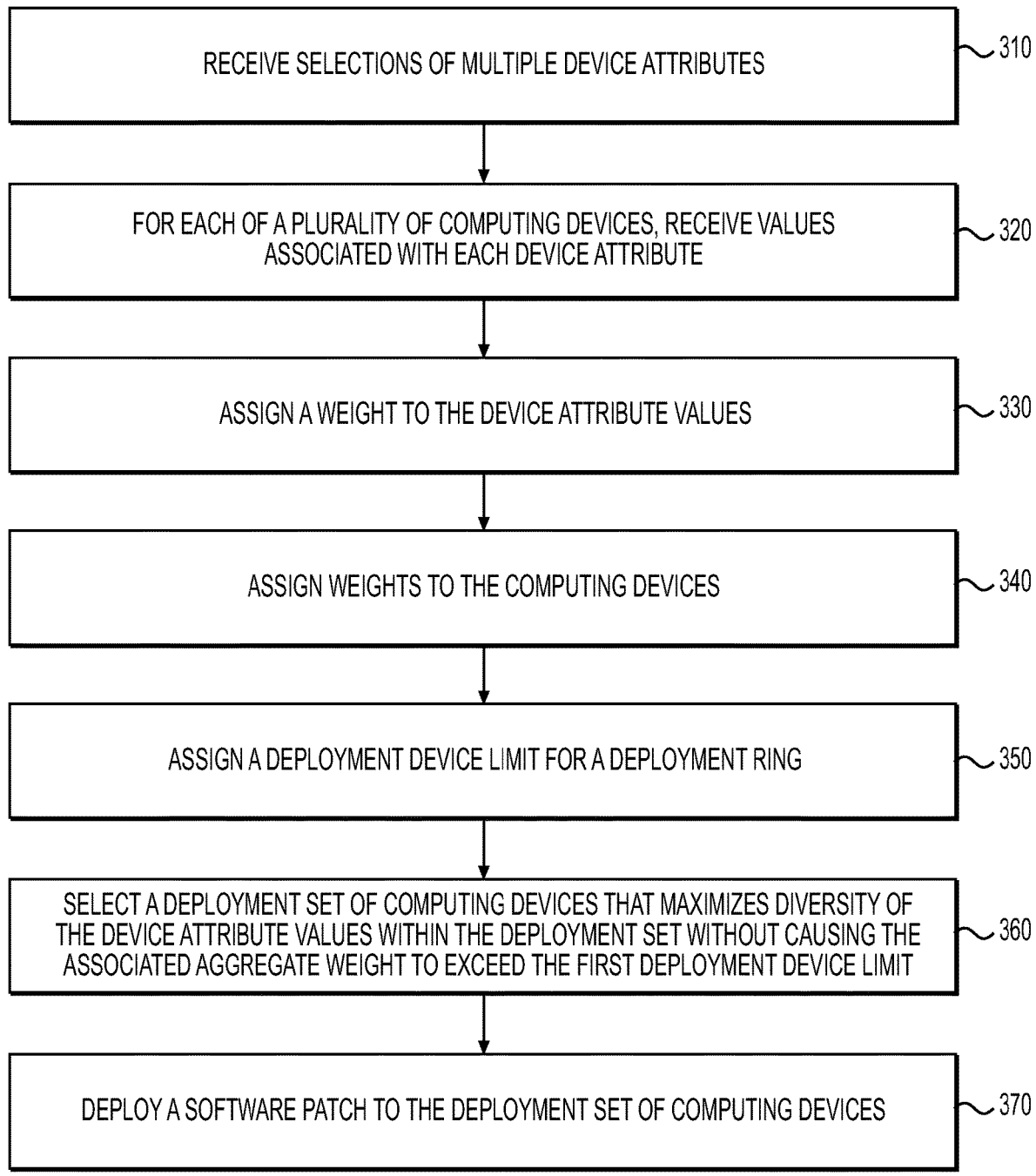
FIG. 3 another flowchart of an example method for intelligent software patch management.

FIG. 3 provides another flowchart of an example method for intelligent software patch management. At stage 310, the ISDS 160 can receive selections of multiple device attributes. The selections can be of one or multiple device attributes. In an example, the selections can be made by an admin user via a GUI associated with the ISDS 160. In one example, ISDS 160 can also receive a software patch ID that associates the selected device attributes with the software patch. The GUI can also allow an admin user to choose groups of devices to include or exclude from the deployment. For example, where a software patch is only to be deployed to a certain department, the patch deployment can be limited to such devices.

At stage 320, for each of a plurality of computing devices 130, the ISDS 160 can assign values associated with each device attribute. In an example, the ISDS 160 can retrieve device information for each computing device 130 that can be included in a deployment ring. The device information can include information about the device attributes for each device 130. In an example, the ISDS 160 can build a table that includes each computing device 130 that will receive the software patch and contextual information about each device 130. For example, the table can include one row for each device 130, and one or more columns corresponding to the selected attributes. In an example, the columns corresponding to the selected attributes can include contextual elements for the computing device 130.

In one example, the ISDS 160 can create contextual elements for each available computing device 130. For example, the ISDS 160 can pair together values corresponding to different combinations of a device's model, manufacturer, OS type, OS version, firmware version, memory size, storage disk size, OS settings, application settings, installed applications, a primary geographic location, and associated user group.

In one example, an admin user can designate feature values that can be excluded from contextual elements. As an example, the ISDS 160 can create contextual elements for the model and OS version of a device 130, but not for geographic location or user group. In one example, the geographic location and user group can still be included in contextual elements that include the device model and OS version, but the ISDS 160 would not create a contextual element that includes only the geographic location and user group.

At stage 330, the ISDS 160 can assign weights to the device attribute values. For example, a particular device model might be considered more important than others, or a particular application might be considered more critical to a business.

In one example, weights can be assigned by an admin user. For example, the admin can assign a weight of 2 to all IPHONE 11 devices and a weight of 1 to all IPHONE 10 devices, or assign a weight of 2 to an email client application and a 0.5 to a photo viewing application. Feature weights can be explicitly chosen by admin users or can be set automatically based on the frequency of occurrence of feature values in deployment rings. In one example, weights can also be assigned to device attributes, which can cause all the associated values to be weighted. In another example, weights can be assigned to contextual elements.

At stage 340, the ISDS 160 can assign costs to the computing devices 130. Assigning costs can differentiate between less-critical and more-critical devices 130. Examples can include assigning costs based the role of the user of the device 130 or the type of service running on the device 130. As an example, devices 130 that are used by executives or members of the finance department can be assigned a higher cost; similarly, devices that run mission-critical services, such as an application or management server, can be assigned a higher cost.

Although some examples include the ISDS 160 assigning both weights and costs, some examples can include assigning only weights or only costs.

At stage 350, the ISDS 160 can determine a deployment budget for a deployment ring. In an example, parameters for the deployment budget can be provided by an admin user. For example, an admin user can use a GUI to input a deployment plan, including the number of deployment rings and the number of computing devices 130 that should be included in each ring. In another example, the deployment budget can be set automatically based on budgets from previous software patch deployments.

At stage 360, the ISDS 160 can select a deployment set of computing devices 130 that maximizes diversity of the device attribute values within the deployment set. In an example, ISDS 160 can use the weights to select computing device 130 for the deployment set. For example, the ISDS 160 can use the weights to prioritize certain values and devices 130 over others. As an example, an admin may want to prioritize including a diverse representation of contextual elements that include both a device model and OS version.

In an example, the ISDS 160 can implement a maximum coverage or greedy algorithm that includes weight values to maximize diversity of the feature values based on the value weights. An example of such a greedy algorithm is outlined below:
Given:
   A universal set E containing n elements $\{e_1, e_2, \ldots, e_n\}$
   A collection of m subsets $S=\{S_1, S_2, \ldots, S_m\}$; $\cup_i S_i = E$
   A number $k \leq m$
   $G \rightarrow \emptyset$; $C \rightarrow \emptyset$; $U \rightarrow S$
   while $|G| < k$ and $|C| < n$ do
      select $S_i \in U$ that maximizes $w(S_i - C)$
      $G \rightarrow G \cup \{S_i\}$
      $C \rightarrow \cup S_i$
      $U \rightarrow U - \{S_i\}$
   end while
   output g In the algorithm above, the subsets S represent the possible combinations of computing devices 130 for a deployment ring, E represents all the values of the selected features, G represents the collection of selected sets, C represents the set of feature values that are already covered at the beginning of an iteration, and w(X) represents the sum of the weights of the elements contained in set X. In one example, the elements in E can represent unique contextual elements found in the pool of devices 130. The greedy algorithm shown above has an approximation ratio of $1-1/e \approx 0.63$, which is the same approximation ratio as the greedy algorithm discussed above regarding FIG. 2 at stage 240.

In an example, ISDS 160 can factor in assigned device costs in the device selection. In such an example, the deployment budget can be a sum of all costs associated with devices 130. For example, where all devices 130 are treated equally, each device can simply have a cost equal to 1, and the number of devices 130 selected will be equal to a number value for the deployment budget. However, when some devices 130 have cost values greater than or less than 1, the number of devices 130 selected for the deployment ring can vary.

In an example, the example greedy algorithm above can be extended to include device costs. An example of such a greedy algorithm is outlined below:
   $G \rightarrow \emptyset$; $C \rightarrow \emptyset$; $U \rightarrow S$
   While $|U| > 0$ and $c(G) < 1$ and $|C| < n$ do
      select $S_i \in U$ that maximizes $w(S_i - C)/c_i$
      if $c(G) + c_i \leq 1$
         $G \rightarrow G \cup \{S_i\}$
         $C \rightarrow C \cup S_i$
      end if
      $U \rightarrow U - \{S_i\}$
   end while
   select a set S that maximizes $w(S_t)$ over S
   if $w(G) \geq w(S_t)$ output G, else output $\{S_t\}$ In the algorithm above, the subsets S represent the possible combinations of computing devices 130 for a deployment ring, E represents all the values of the selected features, G represents the collection of selected sets, C represents the set of feature values that are already covered at the beginning of an iteration, w(X) represents the sum of the weights of the elements contained in set X, and c(X) represents the sum of the costs associated with the sets contained in X. The algorithms discussed herein are merely exemplary and other algorithms can be used to maximize diversity.

At stage 370, the ISDS 160 can deploy a software patch to the deployment set of computing devices. In an example, deployment can be executed by the UEM system 120. For example, the ISDS 160 can send a list of devices 130 and any associated meta-data, such as a software patch ID, to the UEM system 120. The UEM system 120 can then deploy the software patch to the devices 130 in the list.

Figure 4:
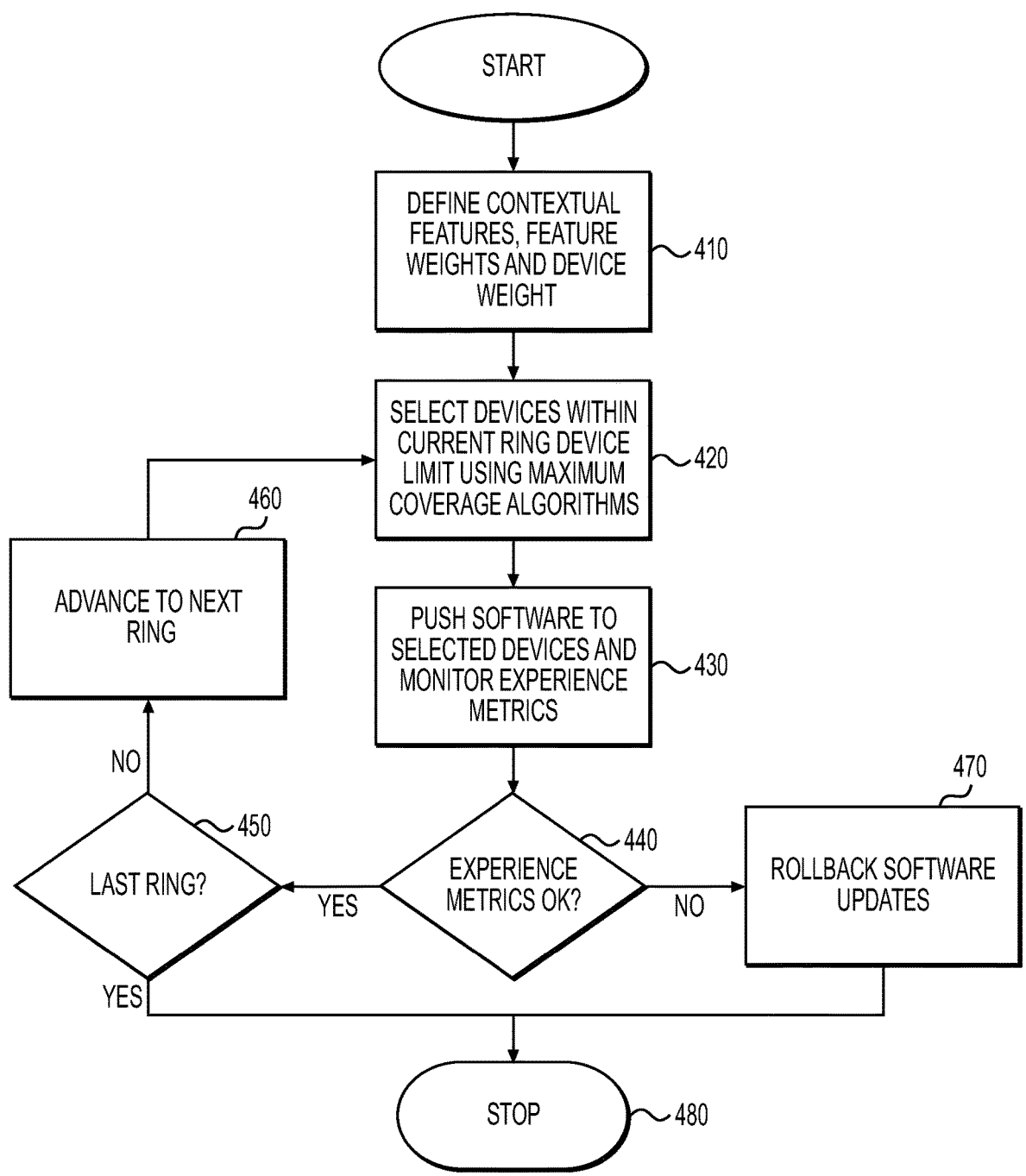
FIG. 4 is a sequence diagram of an example method for intelligent software patch management.

FIG. 4 is a sequence diagram of an example method for intelligent software patch management. At stage 410, the ISDS 160 can define contextual features, feature weights, and device costs. In an example, these can be provided by an amin. For example, an admin user can select features that are important to an enterprise in order to measure contextual diversity. As noted earlier, the set of device attributes that can be used to construct a device context include, but are not limited to, device model, device manufacturer, operating system type and version, firmware version, memory and storage disk sizes, OS and application settings on the device, the set of applications installed on the devices, primary geographic location where the device is used, and the department/group of the user of the device. An admin user can also designate weights for certain features and costs for certain devices 130 or groups of devices 130. In one example, the ISDS 160 can build a table that has one row for each device 130, and one or more columns corresponding to the selected attributes, weights, and costs associated with each device 130.

In some examples, the weights or costs, or both, can be specific to a particular deployment ring. For example, a feature that was heavily tested in a first deployment ring, based on the feature having a high weight for example, can be given a low weight for a second deployment ring in order to select for different features in the different deployment rings.

At stage 420, the ISDS 160 can select computing devices 130 that fit within a deployment ring budget. The deployment budget can correspond to a deployment ring for a software patch. Deployment of the software patch can include multiple rings. In an example, for the first ring the ISDS 160 can retrieve information for all devices 130 that will receive the software patch. The ISDS 160 can create a table that includes a device ID for each device 130 and the feature values associated with each device. After the software patch is rolled out to a ring of devices 130, the ISDS can remove the devices 130 for that ring, or alternatively tag those devices in the table as having received the update. The devices 130 of the next ring can be selected from a pool of devices 130 that have not yet received the patch.

In an example, the ISDS 160 can execute a maximum coverage or greedy algorithm to select a set of devices 130 that maximizes diversity of the feature values based on the provided weights and device costs. In one example, the feature values can be constructed as value pairs, and the algorithm can maximize diversity of the pairs.

At stage 430, the ISDS 160 can push software to the selected computing devices and monitor experience metrics. In an example, deployment can be executed by the UEM system 120. For example, the ISDS 160 can send a list of devices 130 and any associated meta-data, such as a software patch ID, to the UEM system 120. The UEM system 120 can then deploy the software patch to the devices 130 in the list.

The ISDS 160 can monitor the devices 130 that received the software patch for a pre-defined period of time using various performance metrics. Examples of performance metrics (also referred to as experience metrics) can include, but are not limited to, application and OS crash rates, network latencies, CPU utilization, battery drain rates for mobile devices, security/malware incident rates, help-desk ticket rates, and any other aggregate user experience metrics. In an example, an application on the computing devices 130 can gather performance data and send it to the ISDS 160. In one example, a management application installed on the computing devices 130 can gather data relating to the performance metrics and send it to the UEM system 120. The UEM system 120 can then make the data available to the ISDS 160.

At stage 440, the ISDS 160 can determine whether the experience metrics fall within allowable levels. For example, the ISDS 160 can measure the performance metrics and determine whether they fall within an allowable limit of a baseline. In one example, the baseline and allowable limits can be set by an admin user. Alternatively, the baselines and limits can be based on historically measured data.

Where the experience metrics do fall within allowable levels, at stage 450, the ISDS 160 can determine whether the deployment ring is the last ring for a software patch deployment. For example, the software deployment plan can include a set number of rings. If the deployment ring is the last of the set, the method can continue to stage 480 where the ISDS 160 can finish the deployment process. If the deployment ring is not the last in the set, at stage 460, the ISDS 160 can return to stage 420 to advance to the next deployment ring.

If, at stage 440, the measured performance metrics are not within allowable levels, the method can continue to stage 470 where the ISDS 160 can rollback the software patch update, either for the current deployment ring or for all the deployment rings. Rolling back the software patch can also include alerting the admin of a performance issue such that the admin can roll back the updates manually. This can allow admin users to review the performance data and determine what may be causing issues. The ISDS 160 can roll back just the software patch in the current ring in one example. In another example, the ISDS 160 can roll back the updates on all devices 130 that have received it. In an example, the UEM system 120 can roll back the software update based on instructions provided by the ISDS 160. In one example, the ISDS can proceed to stage 480 and stop deployment of the software patch without rolling back the software update. In such an example, an admin user can determine whether to roll back the update.

Figure 5:
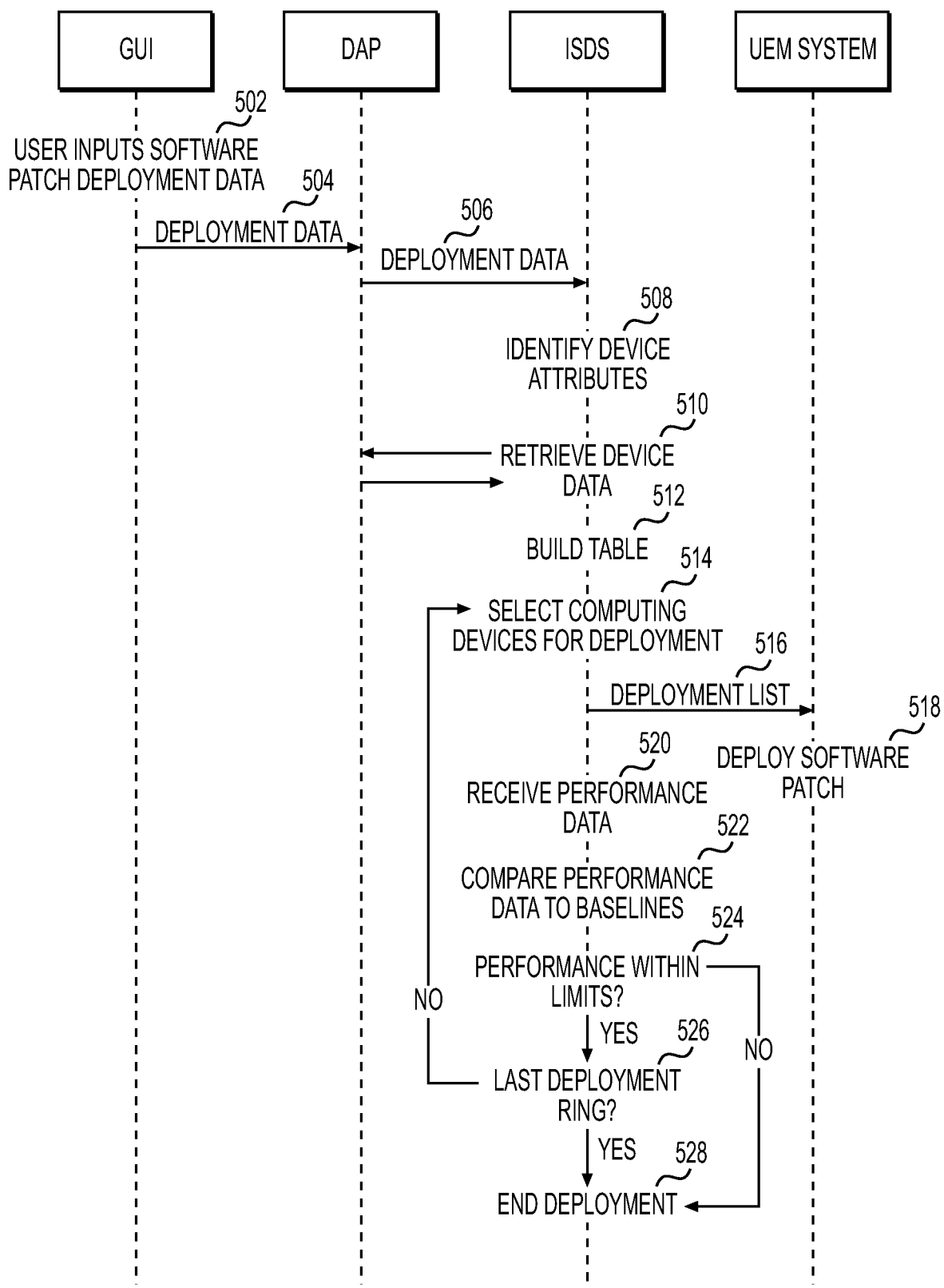
FIG. 5 is another flowchart of an example method for intelligent software patch management.

FIG. 5 is another flowchart of an example method for intelligent software patch management. At stage 502, an admin user can input software patch deployment data into a GUI. For example, the admin user can create a deployment plan for a software patch that designates the number of deployment rings, the deployment budget for each ring, device attributes to be used for selecting devices in the deployment rings, attribute weights, device costs, and so on. In an example, the GUI can be hosted by a webserver. In one example, the webserver can be part of the ISDS 160.

At stage 504, the GUI can send the deployment data to the DAP 110. For example, the webserver that hosts the GUI can send the deployment data as a data file over a network by way of an API call or network protocol, such as HTTP, SOAP, REST, and/or other protocols. In an example, the data pipeline 112 can receive the deployment data and process it. Processing can include formatting the data so that it is readable by the API services 116 and saving the data in the data lake 114. At stage 506, the DAP 110 can send the deployment data to the ISDS 160. In one example, the ISDS 160 can interface with the API services 116 for receiving the data.

At stage 508, the ISDS 160 can define identify device attributes in the deployment data. Some examples of such attributes can include the device model, manufacturer, hardware properties, such as memory and disk sizes, and various settings on the device. At stage 510, the ISDS 160 can retrieve device data from the DAP 110. In an example, the device data can indicate the attributes of each device 130 that is designated to receive the software patch. In one example, this information can be stored at, and retrieved from, the UEM system 120.

At stage 512, the ISDS 160 can build a table that includes information about the computing devices 130 and their corresponding device attributes. For example, the ISDS 160 can build a table that has one row for each device 130, and one or more columns corresponding to the selected attributes, weights, and costs associated with each device 130. In one example, the ISDS 160 can also build contextual elements for each device 130. For example, the ISDS 160 can identify all unique feature pairs that include at least one selected device attribute. The table can include a column for each contextual element of a device 130. In one example, this step can be performed by the context builder 162.

At stage 514, the ISDS 160 can select computing devices 130 for a deployment ring. In an example, the ISDS 160 can execute a maximum coverage or greedy algorithm to select a set of the available devices 130 that maximizes diversity of the feature values based on the provided weights and device costs. In one example, the selected devices 130 can maximize the diversity of contextual elements. If the ring is not the first deployment ring, the ISDS 160 can remove devices from the pool of devices available for the software patch. The ISDS 160 can then select computing devices 130 from a pool of remaining devices that maximizes feature attribute diversity.

At stage 516, the ISDS 160 can send a list of the selected computing devices 130 to the management server 120. In an example, the ISDS 160 can also send a software package for the update. At stage 518, the UEM system 120 can deploy the software patch to the selected computing devices 130. In one example, the UEM system 120 can communicate with a management application on the computing devices 130. The UEM system 120 can send the software package for the update to the devices 130 and instruct the management applications of each device 130 to install the update.

In one example, the UEM system 120 can also instruct the management applications to collect performance data after the patch is installed. The gathered performance data can be based on various metrics. Some examples can include application and OS crash rates, network latencies, CPU utilization, battery drain rates for mobile devices, security/malware incident rates, help-desk ticket rates, and any other aggregate user experience metrics.

At stage 520, the ISDS 160 can receive performance data from the user devices 130. In one example, the management applications on the devices 130 can send the data to the UEM system 120, and the UEM system 120 can process the data and send the processed data to the ISDS 160. Alternatively, processing can occur at the ISDS 160. In an example, processing the performance data can include formatting the data so that it can be compared to predetermined thresholds. In one example, this can include converting numerical data into categorical data.

At stage 522, the ISDS 160 can compare the performance data to baselines. For example, the baseline for each performance metric can include an allowability limit. In one example, the limits can be set by an admin user. In another example, the limits can be determined automatically by the ISDS 160 based on default settings or previous software deployments.

At stage 524, the ISDS 160 can determine whether the performance data falls within the predetermined limits from the baseline. If the performance data does not fall within the allowable limits, the method can continue to stage 528 where the USDS 160 can end the software deployment. In one example, the ISDS 160 can continue to gather performance data, but not deploy the update to any further devices 130. In another example, the ISDS 160 can roll back the software update from the devices 130 that have received it. The ISDS 160 can roll back the updates from devices 130 in the ring where the issue arose or from all devices 130 that have received the patch. The ISDS 160 can also notify an admin user of the performance issue. In one example, the ISDS 160 can pause deployment until an admin user designates an action take, such as rolling back the software update or continuing despite the performance issue.

If the performance data does fall within the allowable limits, the method can continue to stage 526 where the ISDS 160 can determine whether the deployment ring is the last deployment ring. For example, the deployment can include a set number of rings. If the current ring is the last ring, the ISDS 160 can end deployment at stage 528. Otherwise, the ISDS 160 can return to stage 514 where it selects devices 130 for the next deployment ring.

Figure 6A:
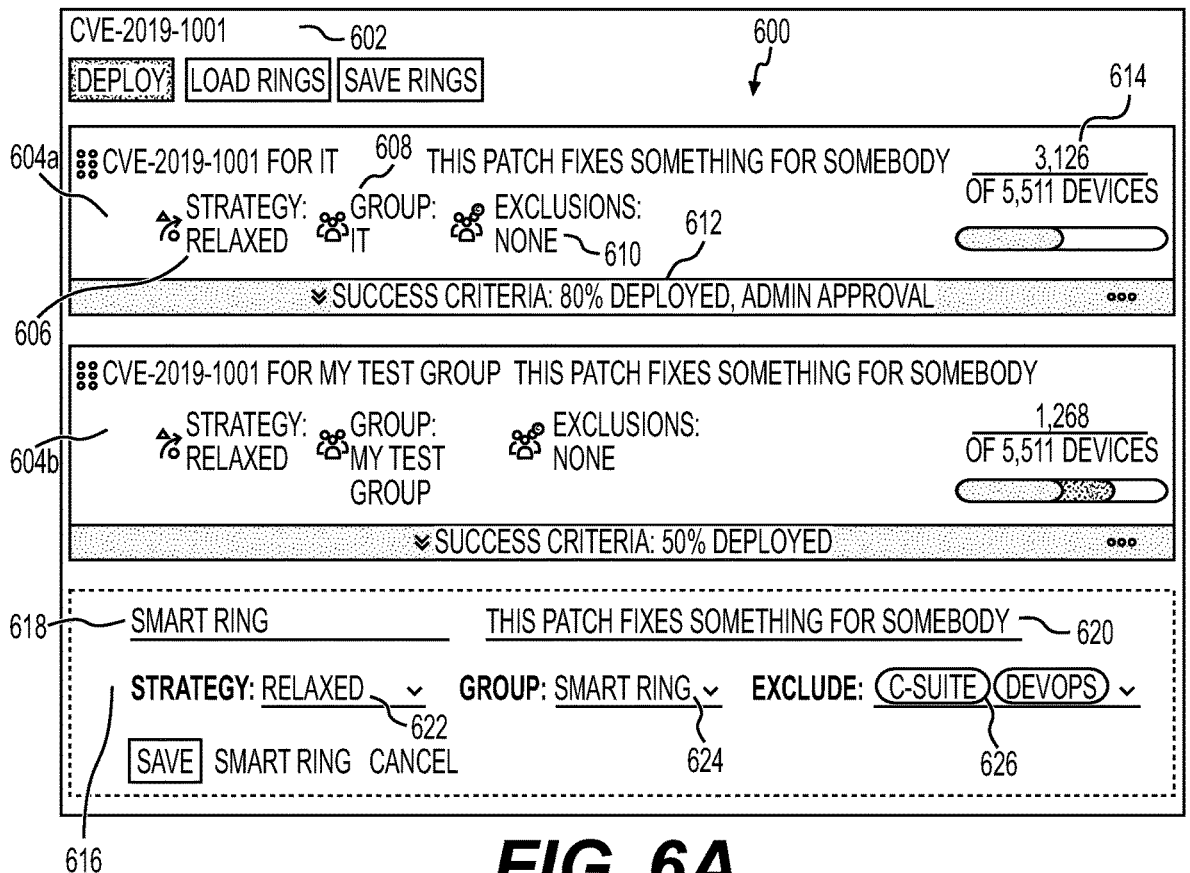
FIG. 6A is an illustration of an example graphical user interface ("GUI") of a display used to perform intelligent software patch management.

FIG. 6A an illustration of an example GUI 600 of a display used to perform intelligent software patch management. The GUI 600 can include an ID field 602 that displays a name or ID of the software patch. Deployment windows 604a and 604b display information about a deployment ring that has already been deployed. The deployment window 604a includes information about the deployment strategy 606, device group 608, and any exclusions 610. Exclusions can be devices or device types not included in the deployment ring. In an example, the deployment strategy 606 can designate how strict to set the baseline limits. For example, a "strict" strategy can require the performance data fall within a low threshold within the baseline, indicating better performance, but a "relaxed" strategy can allow for higher thresholds.

The device group 608 can indicate which pool of devices 130 that the selected devices 130 were chosen from. For example, in the deployment ring for deployment window 604a, the patch was deployed to devices 130 within an "IT Group." In the deployment ring for deployment window 604b, the patch was deployed to devices 130 within a group designated "My Test Group." The deployment window 604a shows that no devices or groups have been excluded from the deployment ring. The deployment window 604a also includes a status bar 612 that can display information like what percentage of devices 130 in the ring have installed the update and have performance metrics within allowable limits, and whether an admin has approved the performance data of the ring. The deployment window 604a also includes an update counter 614 that displays the number of devices within the ring that have received the patch.

The GUI 600 also includes a deployment ring creator 616. The deployment ring creator 616 allows a user to enter name for the ring at name field 618. Here, the user has named the ring "Smart Ring." The user can also provide a description of the ring in the description field 620. The user can also select a strategy at strategy element 622, a device group at group element 624, and any exclusions at exclusion element 626. In FIG. 6A, the user is excluding user devices 130 in the "C-Suite" and "Devops" groups from the deployment ring using the exclusion element 626.

Figure 6B:
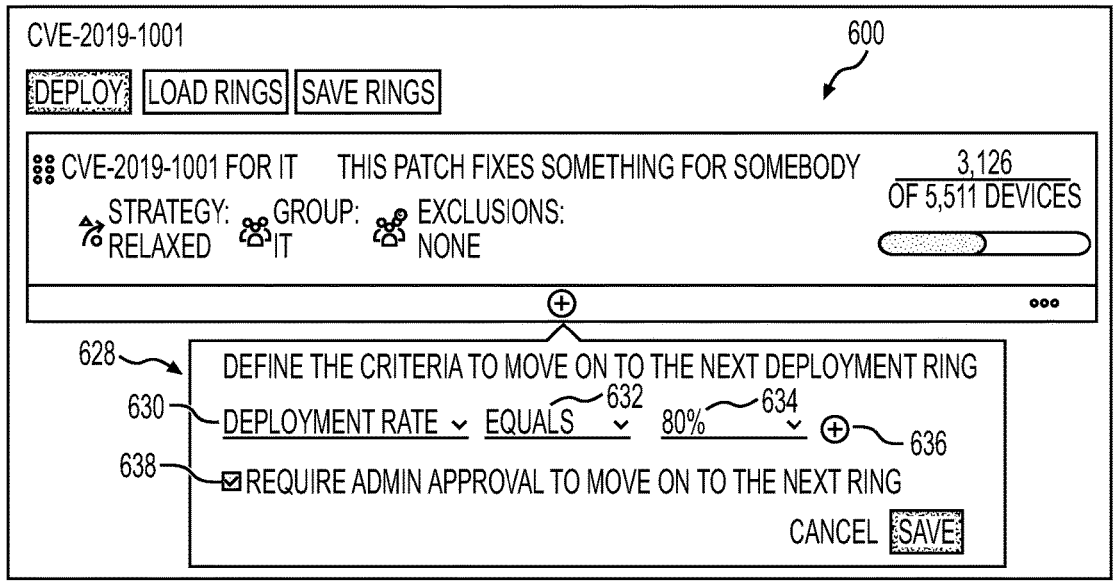
FIG. 6B is an illustration of an example success criteria window in a GUI that allows a user to define the criteria for success of a deployment ring.

FIG. 6B illustrates an example success criteria window 628 of GUI 600 that allows a user to define the criteria for success of a deployment ring. The success criteria window 628 includes a criteria menu 630 that allows a user to select a criterion for defining. In FIG. 6B, the user is defining success for the deployment rate of the ring. A metric menu 632 allows the user to choose how the criterion is assessed and a value field 634 allows the user to choose the value for success. For example, FIG. 6B shows that the user has chosen that success is reached when deployment reaches 80% of the selected devices 130. The success criteria window 628 also includes an addition element 636 that, when selected, allows a user to define another criterion. The success criteria window 628 can also include an admin approval button 638 that, when selected, requires that an admin user approve the ring.

Figure 7:
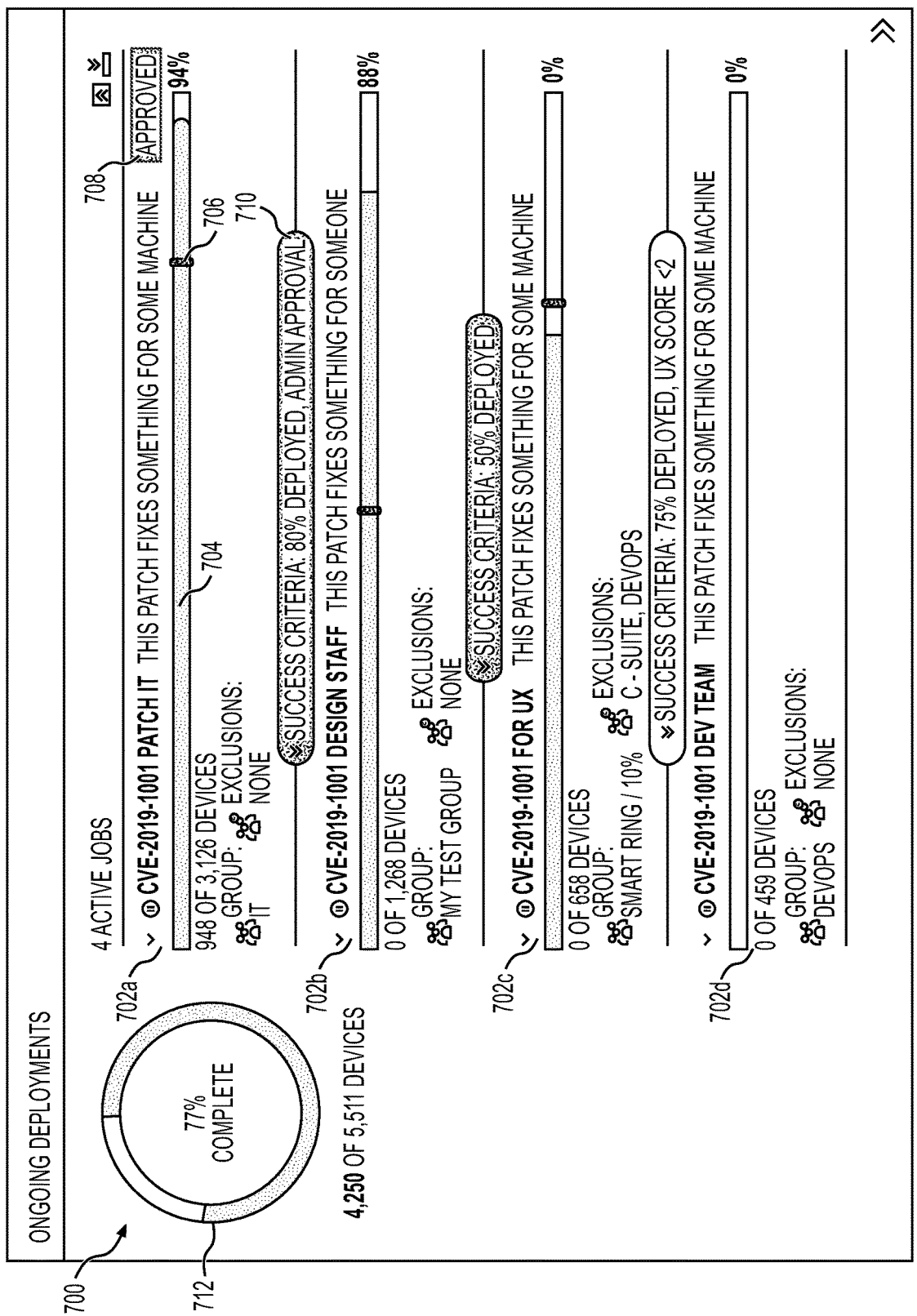
FIG. 7 is an illustration of a second example GUI for performing intelligent software patch management.

FIG. 7 is an illustration of a metric GUI 700 for performing for intelligent software patch management that displays information about performance metrics in a software update deployment. The metric GUI 700 shown includes several metric windows 702a, 702b, 702c, and 702d. Each of metric windows 702a, 702b, 702c, and 702d displays information about performance data measured from devices 130 in ongoing deployments. For example, metric window 702a includes a performance bar 704 that displays percentage of devices 130 in an associated deployment ring that have received the patch and whose metrics fall within allowable limits according to the defined criteria. The performance bar 704 can include a success marker 706 that is located on the performance bar 704 where the deployment ring will reach success status. For example, the metric window 702*a*, as shown on the status bar 710, requires 80% deployment, at the success marker 706 is located 80% of the length of the performance bar 704 from the left side. An admin approval status indicator 708 indicates that the ring has been approved. Therefore, according to the criteria displayed in the status bar 710, the ring has met all the criteria for success.

The metric window 702*b* shown in metric GUI 700 has reached 88% deployment, while it was required to reach 50% for success. The metric window 702*c* requires a UX score of less than 2. As shown, less than 75% of the devices 130 in the ring have received the patch, so the patch is still ongoing with respect to that deployment ring. The metric window 702*d* shows that its corresponding ring has yet to begin. In an example, the metric GUI 700 can include a completion chart 712 that shows the total completion of the deployment.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for intelligent software patch management, comprising:
   receiving a selection of a first device attribute;
   constructing, in a database, a data table that associates each computing device of a plurality of computing devices with at least one value corresponding to the first device attribute;
   assigning, in the data table of the database, a weight to the at least one value for each computing device of the plurality of computing devices;
   determining, using the data table of the database, a first deployment device limit for a first deployment ring, wherein the first deployment device limit for the first deployment ring is based at least on a number of computing devices and the weight of the at least one value for each computing device of the plurality of computing devices;
   selecting, using the data table of the database, a first deployment set of computing devices from the plurality of computing devices, wherein the first deployment set of computing devices from the plurality of computing devices maximizes diversity of the at least one value for each computing device of the plurality of computing devices within the first deployment set of computing devices from the plurality of computing devices; and
   deploying a software patch to the first deployment set of computing devices from the plurality of computing devices.

2. The method of claim 1, further comprising:
   receiving a selection of a second device attribute; and
   receiving at least one value associated with the second device attribute, wherein constructing, in the database, the data table includes associating each computing device of the plurality of computing devices with at least one value corresponding to the second device attribute, and wherein the first deployment set of computing devices from the plurality of computing devices maximizes the diversity of the values corresponding to the first and second device attributes within the first deployment set of computing devices from the plurality of computing devices.

3. The method of claim 1, further comprising:
   monitoring performance metrics on the first deployment set of computing devices from the plurality of computing devices; and
   in an instance where the performance metrics fall within a threshold:
      determining a second deployment device limit for a second deployment ring;
      selecting a second deployment set of computing devices from the plurality of computing devices, wherein the second deployment set of computing devices from the plurality of computing devices:
         excludes the first deployment set of computing devices from the plurality of computing devices, and
         maximizes diversity of the first device attribute within the second deployment set of computing devices from the plurality of computing devices without causing an associated aggregate weight to exceed the second deployment device limit for the second deployment ring; and
      deploying the software patch to the second deployment set of computing devices from the plurality of computing devices.

4. The method of claim 1, further comprising assigning a device weight associated with each computing device of the plurality of computing devices, wherein the first deployment set of computing devices from the plurality of computing devices maximizes diversity of the first device attribute within the first deployment set of computing devices from the plurality of computing devices without causing an associated aggregate device weight to exceed the first deployment device limit for the first deployment ring.

5. The method of claim 1, wherein the first device attribute comprises at least one of a device model, a device manufacturer, an operating system ("OS") type, an OS version, a firmware version, a memory size, a storage disk size, OS settings, application settings, a set of installed applications, a primary geographic location, and a user group.

6. The method of claim 1, wherein constructing, in the database, the data table further comprises:
   determining that the at least one value corresponding to the first device attribute is a numerical value; and
   categorizing the numerical value based on at least one threshold.

7. The method of claim 1, further comprising:
   monitoring performance metrics on the first deployment set of computing devices from the plurality of computing devices; and
   in an instance where the performance metrics fall outside of a threshold, rolling back the deployed software patch to the first deployment set of computing devices from the plurality of computing devices.

8. A non-transitory, computer-readable medium containing instructions that, when executed by a hardware-based processor, perform stages for intelligent software patch management, the stages comprising:

receiving a selection of a first device attribute;
constructing, in a database, a data table that associates each computing device of a plurality of computing devices with at least one value corresponding to the first device attribute;
assigning, in the data table of the database, a weight to the at least one value for each computing device of the plurality of computing devices;
determining, using the data table of the database, a first deployment device limit for a first deployment ring, wherein the first deployment device limit for the first deployment ring is based at least on a number of computing devices and the weight of the at least one value for each computing device of the plurality of computing devices;
selecting, using the data table of the database, a first deployment set of computing devices from the plurality of computing devices, wherein the first deployment set of computing devices from the plurality of computing devices maximizes diversity of the at least one value for each computing device of the plurality of computing devices within the first deployment set of computing devices from the plurality of computing devices; and
deploying a software patch to the first deployment set of computing devices from the plurality of computing devices.

9. The non-transitory, computer-readable medium of claim 8, the stages further comprising:
receiving a selection of a second device attribute; and
receiving at least one value associated with the second device attribute, wherein constructing, in the database, the data table includes associating each computing device of the plurality of computing devices with at least one value corresponding to the second device attribute, and wherein the first deployment set of computing devices from the plurality of computing devices maximizes the diversity of the values corresponding to the first and second device attributes within the first deployment set of computing devices from the plurality of computing devices.

10. The non-transitory, computer-readable medium of claim 8, the stages further comprising:
monitoring performance metrics on the first deployment set of computing devices from the plurality of computing devices; and
in an instance where the performance metrics fall within a threshold:
determining a second deployment device limit for a second deployment ring;
selecting a second deployment set of computing devices from the plurality of computing devices, wherein the second deployment set of computing devices from the plurality of computing devices:
excludes the first deployment set of computing devices from the plurality of computing devices, and
maximizes diversity of the first device attribute within the second deployment set of computing devices from the plurality of computing devices without causing an associated aggregate weight to exceed the second deployment device limit for the second deployment ring; and
deploying the software patch to the second deployment set of computing devices from the plurality of computing devices.

11. The non-transitory, computer-readable medium of claim 8, the stages further comprising assigning a device weight associated with each computing device of the plurality of computing devices, wherein the first deployment set of computing devices from the plurality of computing devices maximizes diversity of the first device attribute within the first deployment set of computing devices from the plurality of computing devices without causing an associated aggregate device weight to exceed the first deployment device limit for the first deployment ring.

12. The non-transitory, computer-readable medium of claim 8, wherein the first device attribute comprises at least one of a device model, a device manufacturer, an operating system ("OS") type, an OS version, a firmware version, a memory size, a storage disk size, OS settings, application settings, a set of installed applications, a primary geographic location, and a user group.

13. The non-transitory, computer-readable medium of claim 8, wherein constructing, in the database, the data table further comprises:
determining that the at least one value corresponding to the first device attribute is a numerical value; and
categorizing the numerical value based on at least one threshold.

14. The non-transitory, computer-readable medium of claim 8, the stages further comprising:
monitoring performance metrics on the first deployment set of computing devices from the plurality of computing devices; and
in an instance where the performance metrics fall outside of a threshold, rolling back the deployed software patch to the first deployment set of computing devices from the plurality of computing devices.

15. A system for intelligent software patch management, comprising:
a memory storage including a non-transitory, computer-readable medium comprising storing instructions; and
a computing device including a hardware-based processor that executes the instructions to perform stages comprising:
receiving a selection of a first device attribute;
constructing, in a database, a data table that associates each computing device of a plurality of computing devices with at least one value corresponding to the first device attribute;
assigning, in the data table of the database, a weight to the at least one value for each computing device of the plurality of computing devices;
determining, using the data table of the database, a first deployment device limit for a first deployment ring, wherein the first deployment device limit for the first deployment ring is based at least on a number of computing devices and the weight of the at least one value for each computing device of the plurality of computing devices;
selecting, using the data table of the database, a first deployment set of computing devices from the plurality of computing devices, wherein the first deployment set of computing devices from the plurality of computing devices maximizes diversity of the at least one value for each computing device of the plurality of computing devices within the first deployment set of computing devices from the plurality of computing devices; and
deploying a software patch to the first deployment set of computing devices from the plurality of computing devices.

16. The system of claim 15, the stages further comprising:
receiving a selection of a second device attribute; and
receiving at least one value associated with the second device attribute, wherein constructing, in the database, the data table includes associating each computing device of the plurality of computing devices with at least one value corresponding to the second device attribute, and wherein the first deployment set of computing devices from the plurality of computing devices maximizes the diversity of the values corresponding to the first and second device attributes within the first deployment set of computing devices from the plurality of computing devices.

17. The system of claim 15, the stages further comprising:
monitoring performance metrics on the first deployment set of computing devices from the plurality of computing devices; and
in an instance where the performance metrics fall within a threshold:
determining a second deployment device limit for a second deployment ring;
selecting a second deployment set of computing devices from the plurality of computing devices, wherein the second deployment set of computing devices from the plurality of computing devices:
excludes the first deployment set of computing devices from the plurality of computing devices, and
maximizes diversity of the first device attribute within the second deployment set of computing devices from the plurality of computing devices without causing an associated aggregate weight to exceed the second deployment device limit for the second deployment ring; and
deploying the software patch to the second deployment set of computing devices from the plurality of computing devices.

18. The system of claim 15, the stages further comprising assigning a device weight associated with each computing device of the plurality of computing devices, wherein the first deployment set of computing devices from the plurality of computing devices maximizes diversity of the first device attribute within the first deployment set of computing devices from the plurality of computing devices without causing an associated aggregate device weight to exceed the first deployment device limit for the first deployment ring.

19. The system of claim 15, wherein the first device attribute comprises at least one of a device model, a device manufacturer, an operating system ("OS") type, an OS version, a firmware version, a memory size, a storage disk size, OS settings, application settings, a set of installed applications, a primary geographic location, and a user group.

20. The system of claim 15, wherein constructing, in the database, the data table further comprises:
determining that the at least one value corresponding to the first device attribute is a numerical value; and
categorizing the numerical value based on at least one threshold.

* * * * *